United States Patent [19]
McCorkle

[11] Patent Number: 5,805,098
[45] Date of Patent: Sep. 8, 1998

[54] METHOD AND SYSTEM FOR FORMING IMAGE BY BACKPROJECTION

[75] Inventor: John W. McCorkle, Laurel, Md.

[73] Assignee: The United States of America as represented by the Secretary of the Army, Washington, D.C.

[21] Appl. No.: 741,541

[22] Filed: Nov. 1, 1996

[51] Int. Cl.$^6$ ................................................ G01S 13/90
[52] U.S. Cl. ........................ 342/25; 342/179; 342/197; 364/413.21
[58] Field of Search ................................. 342/25, 22, 179, 342/191, 195, 197; 364/413.19, 413.21; 378/4, 10, 15; 128/653.1, 660.01, 661.01, 721, 782; 73/597, 625, 626; 382/131

[56] References Cited

U.S. PATENT DOCUMENTS

| | | | |
|---|---|---|---|
| 5,053,958 | 10/1991 | Tam | 364/413.13 |
| 5,253,171 | 10/1993 | Hsiao et al. | 364/413.19 |
| 5,446,461 | 8/1995 | Frazier | 342/22 |
| 5,465,722 | 11/1995 | Fort et al. | 128/661.01 |
| 5,573,012 | 11/1996 | McEwan | 128/782 |
| 5,625,660 | 4/1997 | Tuy | 378/15 |

OTHER PUBLICATIONS

McCorkle & Rofheart, Copy of Vu–Graph Presentation made at SPIE, Apr. 8, 1996.

*Primary Examiner*—John B. Sotomayor
*Attorney, Agent, or Firm*—Muzio B. Roberto; Paul S. Clohan

[57] ABSTRACT

The method and system quickly and simultaneously generate multi-resolution and high-resolution imagery from projection data obtained, e.g., through synthetic aperture radar, magnetic resonance imaging, x-ray CAT scans, seismic imaging, sonar imaging, and acoustic imaging. The backprojector technique is modified by a quadtree decomposition of the image area. The sensor elements are grouped into subapertures, and an image is formed in each subaperture by backprojection. The subapertures are grouped into larger subapertures and an image is formed in each of the larger subapertures by backprojection. This operation is repeated until a single large subaperture is defined which covers the entire antenna array. In this way, common additions are factored, computed once and reused many times. A set of N projections can produce an N×N image through $O(N^2 \log N)$ operations.

29 Claims, 14 Drawing Sheets

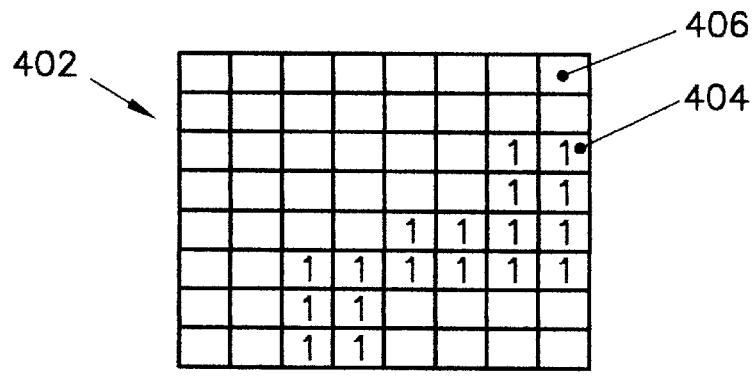
FIGURE 4A
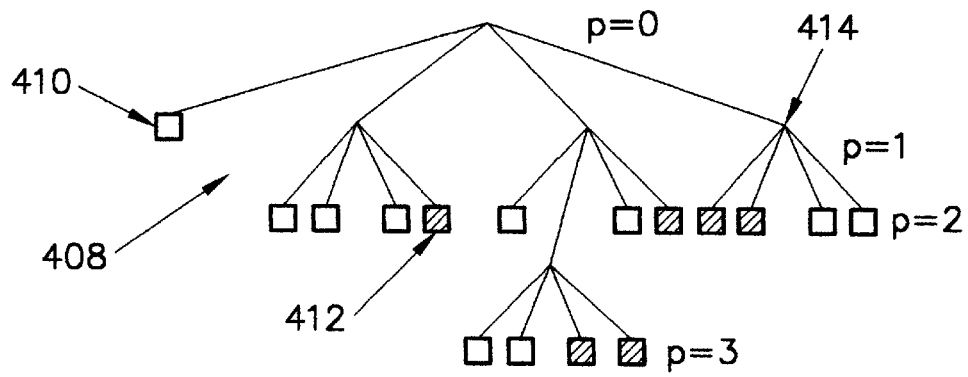
FIGURE 4B
FIGURE 4C
FIGURE 4D

METHOD AND SYSTEM FOR FORMING IMAGE BY BACKPROJECTION

FIELD OF THE INVENTION

The invention is directed to a method and system for forming an image by backprojection from data taken by an array of antenna elements.

DESCRIPTION OF THE RELATED ART

The present invention relates to the generation of images from projection measurements. A particularly important example includes two-dimensional and three-dimensional SAR (synthetic aperture radar) and ISAR (inverse SAR) systems which image objects and many features of the ground from satellites, aircraft, ground vehicles or any other moving platform. Such systems are used in detecting, locating and sometimes identifying ships, ground vehicles, mines, buried pipes, roadway faults, tunnels, leaking buried pipes, etc., as well as discovering and measuring geological features, forest features, mining volumes, etc., and general mapping. In one example (illustrated in FIG. 1) which will be helpful in understanding both known projection systems and the present invention, aircraft 101 carries detector array 103 to take radar measurements within range 105 on ground 107. The aircraft ideally flies at a uniform speed in the direction indicated by arrow A, but in reality is often buffeted by winds so that it moves up and down, as indicated by double-headed arrow B.

Other systems using projection measurements are fault inspection systems using acoustic imaging, submarine sonar for imaging underwater objects and the like, seismic imaging system for tunnel detection, oil exploration, geological surveys, etc., and medical diagnostic tools such as sonograms, echocardiograms, x-ray CAT (computer-aided tomography) equipment and MRI (magnetic resonance imaging) equipment.

There are two basic techniques used to implement a system to produce images from projection data. These are typically referred to as time domain, where a backprojection-type algorithm is used, and frequency domain, where Fourier transforms are used. Backprojection-based focusing has been used for numerous applications, including the above. Medical practitioners have used it for x-ray CAT scans, MRI and sonograms. Historically, medical people have preferred backprojection because its artifact levels were lower than those in FFT (fast Fourier transform) approaches. Seismologists and people using SAR have also used backprojection. Work on speeding up the backprojection process has focused on fast index generation. The algorithm form used by the medical industry (e.g., Star Computers) for x-ray CAT scans requires approximately $2N^3$ adds to form an N by N image from N projections—$N^3$ adds for indexing operations, and $N^3$ adds for accumulating the projections into the image.

However, most SAR focusers are implemented using FFT techniques to reduce the computational load. SAR imaging is more complex for a variety of reasons. First, the data is not taken on pristine equally (or known) spaced points. Instead, it is taken from an aircraft that is buffeted by the wind. Therefore, motion compensation must be applied in order to produce sharp images. Second, the objects need not be point sources but may be dispersive—where they store energy and re-radiate it later in time. Ground penetrating SAR adds the complication that the media propagation velocity is not constant. Seismic processing also must deal with this complication. One common FFT technique, called the $\omega k$ technique, Fourier transforms Maxwell's wave equation in both time and distance along the axis of the aperture to convert a partial differential equation into an ordinary differential equation. For many SAR applications, especially for high-resolution, ultra-wide-angle (UWA), ultra-wide-bandwidth (UWB) surveillance systems, the task is particularly problematic because the data set sizes are large, real-time operation is a must, and the aperture geometry is not controlled. For example, since small aircraft such as aircraft 101 of FIG. 1 are buffeted by the wind, SAR data can have significant off-track motion and velocity changes. As a result, the data are not equally spaced. Since a FFT requires data to be equally spaced, FFT-based techniques produce sub-optimal images. Also, two-dimensional FFT's are not well suited to multiprocessor-based supercomputers because they face a corner-turn interprocessor communication bottleneck. Furthermore, in applications such as ground penetrating (GPEN) SAR, there is a propagation velocity change in the media (i.e., between the air and the soil). This velocity change is difficult to account for with FFT techniques in the slant-plane geometry of a SAR.

While there are many forms of Fourier-based algorithms, they fall into two broad classes known as "strip-map" mode and "spot light" mode. The most robust technique is the $\omega k$ technique, also known as seismic migration. The advantage of the $\omega k$ algorithm over the backprojection algorithm is speed. The $\omega k$ algorithm is an order $N^2 \log_2(N)$ implementation—much faster than $N^3$ for large images and data sets.

There are many advantages for backprojection. One is that it produces the sharpest images. While artifacts from the $\omega k$ technique can be mitigated to some degree, they are never totally eliminated, and the more they are mitigated, the greater the cost in increased computations. Backprojector implementations also generate image artifacts; however, they are constrained to be local to the object generating the artifacts—they always lie within the theoretical sidelobes. Another advantage of the backprojector is that it allows for non-uniform spacing of the projection data. Non-uniform spacing is directly accounted for in the index generation. This feature is very important for compensating aircraft motion. The $\omega k$ implementation requires equally spaced data in order to use an FFT (Fast Fourier Transform). Non-uniform spacing requires a DFT (Discrete Fourier Transform) which would make the routine even more computationally expensive than a backprojector. Yet another advantage of the backprojector is that multi-layer complex media with varying propagation velocity is again directly handled in the address generation. A multi-layer media can be modeled by a polynomial which then directly feeds the backprojector with essentially no increase in computational burden. Yet another disadvantage of the Fourier technique is that it requires a transpose or "corner turn memory." Currently, the most cost effective supercomputing performance is obtained in multi-processor systems. On multi-processor systems, this transpose requires every processor node to communicate with every other processor node. This communication requirement, while not impossible, severely impacts system costs and performance. Backprojection is highly parallelizable and requires little interprocessor communication. A problem for both backprojection and $\omega k$ is that it is difficult to produce multi-resolution images. Multi-resolution imagery allows the study of phenomena that exist over only a portion of an aperture. For example, three sub-apertures can provide three look angles. Each sub-aperture could be focused into an N-by-N image, and those three low-resolution images could be summed to form a higher resolution image. However, the low-resolution images have required excessive computations because they always generate an over-sampled, N-by-N image.

Time domain image formation, or backprojection, from SAR data, is accomplished by coherently summing the sampled radar returns for each pixel. In this context, coherent summation can be thought of as time-shifting the signal obtained at each aperture position (to align them to a particular pixel) and adding across all aperture positions to integrate the value at that pixel. This time-align-and-sum sequence is repeated for every pixel in the image.

More specifically, backprojection works in the following manner, which will be explained with reference to FIG. 2. In this figure, antennas at positions 208 along axis 204 in an array observe pixels 202 in the near field of the array; a relative position of each pixel (q,r) with respect to each antenna position j defines a vector 206. Time domain backprojection is coherent summation realized by a delay-and-sum beamformer focused to a particular location in the near field of the antenna. For each pixel (q,r), this process time-shifts the signals obtained at each aperture position j (to align, or stack, them at a particular pixel location) to correct the signals for propagation time along each vector 206 and then adds across all aperture positions to integrate to the value at the pixel. Thus, signals propagating from that location are in-phase and reinforce, while signals propagating from other locations destructively interfere and integrate toward zero. The image is generated by forming such a sum for each pixel as shown in equation (1) below.

In equation (1) below, the pixels of the image area are indexed by (q,r) and the aperture positions are indexed by j, where j=0 . . . L−1 and L is the number of elements in the aperture. If $s_j(t)$ represents the range-compensated ($R^2$ propagation loss corrected, where R is range) voltage received at the $j^{th}$ aperture position as a function of time (t), $z_j$ is an aperture weighting to shape the sidelobes, for example, with a Hamming window, or to account for the aperture spacing, and $T_{q,r,j}$ is the time shift necessary to align the signal received at sensor j to the pixel at position (q,r) (a function of the round-trip time from sensor phase center to pixel position), then the value of the focused pixel at image position (q,r) is given by $$f_{q,r}(t) = \sum_{j=0}^{L-1} z_j \cdot s_j(t + T_{q,r,j}). \quad (1)$$

Here, t describes how the focused signal at location (q,r) varies with time, and is useful for studying late-time target ringing. This description of backprojection considers the case where t is fixed for the entire image.

Accurately obtaining the time-shifted values $s_j(t+T_{q,r,j})$ requires a time domain interpolation of the sampled received signals. This can be adequately accomplished by the following steps:

1. Up-sample and low-pass filter the received signal to produce a finer resolution signal $\tilde{s}_j$.
2. Compute the floating point indexes into the sequence $\tilde{s}_j$ corresponding to time $t+T_{q,r,j}$.
3. Linearly interpolate between samples to obtain an approximation of $s_j(t+T_{q,r,j})$.

Because the time-shifts of equation (1) depend only on pulse round-trip time, the motion compensation problem is reduced to finding the correct time shifts for the platform positions. Similarly, compensating for known variations in the propagation velocity through the media reduces to finding the correct time shifts. Both cases normally require the solution of a 3D trigonometric equation for each pixel and at every aperture point. This prospect is computationally burdensome because it would require $N^3$ trigonometric computations. They can both, however, be accomplished by polynomial approximation, where a polynomial G(q,r,j) produces the index into $\tilde{s}_j$ corresponding to $T_{q,r,j}$. The use of a polynomial approximation can account for aircraft motion by simply offsetting the indexes. Fast recursive evaluation of the polynomial leads to an algorithm that requires only a single addition to compute each index. Therefore, each of the $N^2$ pixels of the image requires two operations for each aperture position, one to compute the index, and one to sum the data into the image. So after optimization, the focused delay-and-sum image former remains an O(AP) algorithm.

Backprojection has several good properties for SAR. For example, backprojection allows motion compensation and variation in media velocity to be handled by time shift only, which is a simple indexing operation. Accurately obtaining the time-shifted values requires an interpolation. Errors made in this interpolation cause some signal loss and cause artifacts to appear in the focused image. For the backprojector, however, these artifacts are local. On any downrange cut in an image they are constrained such that there are no artifacts directly behind or in front of the object generating them nor in front of the first (nearest to the aperture) sidelobe nor behind the last (farthest from the aperture) sidelobe. This constraint on these artifacts is an advantage over Fourier domain image formation, where artifacts appear globally because the interpolation is done in the frequency domain. Another useful property is that target signatures are preserved, because coherent summation is frequency independent. However, the computational cost of direct time domain backprojection is high. Each of the $N^2$ pixels in an N-by-N image requires an operation (an addition) for each of the N positions of the aperture, resulting in an $O(N^3)$ algorithm. Optimized algorithms require $2N^3$ adds, where the indexing is done recursively such that each index calculation takes only a single add. Since adders take less chip real estate than multipliers, Agi et al. (cited below) developed a custom LSI (large scale integrated) circuit chip with banks of parallel adders to perform backprojection efficiently.

The following references give an overview of the state of the art and are hereby incorporated by reference in their entireties:

1. John W. McCorkle, "Focusing Of Synthetic Aperture Ultra Wideband Data," *IEEE Int'l Conf on Systems Engineering,* August, 1992, p. 1–5;
2. John W. McCorkle and Lam Nguyen, "Focusing of Dispersive Targets Using Synthetic Aperture Radar," ARL-TR-305, August, 1994;
3. J. Claerbout, *Imaging the Earth's Interior,* Blackwell Scientific Publications, Boston, Mass., 1985;
4. John McCorkle, Copy of Vu-Graph Presentation made at SPIE, Apr. 8, 1996;
5. John W. McCorkle and Martin Rofheart, "An N2Log (N) Backprojector Algorithm for Focusing Wide-Angle Wide-Bandwidth Arbitrary-Motion Synthetic Aperture Radar," *Radar Sensor Technology SPIE AeroSense Conference* 2747, April, 1996, Orlando, Fla.;
6. J. Claerbout, *Fundamentals of Geophysical Data Processing,* McGraw-Hill, New York, 1976;
7. O. Yilmaz, *Seismic Data Processing,* Society of Exploration Geophysicists, Tulsa, 1987;
8. R. Stolt, "Migration by Fourier Transform," *Geophysics,* Vol. 43, p. 23ff.;
9. F. Rocca, C. Cafforio, and C. Prati, "Synthetic Aperture Radar: A New Application for Wave Equation Techniques," *Geophysical Prospecting*, Vol. 37, 1989—pp. 809–830;

10. C. Cafforio, C. Prati, and F. Rocca, "SAR Data Focusing Using Seismic Migration Techniques," *IEEE Transactions on Aerospace and Electronic Systems*, Vol. AES-27, No. 2, March, 1991, pp. 194–206;

11. R. Bamler, "A Comparison of Range Doppler and Wavenumber Domain SAR Focusing Algorithms," *IEEE Transactions on Geoscience and Remote Sensing*, Vol. 30, No. 4, Jul. 1, 1992, pp. 706–713;

12. J. McCorkle and L. Nguyen, "Ultra Wide Bandwidth Synthetic Aperture Radar Focusing of Dispersive Targets," HDL-R-ST-R-92-004, March, 1992;

13. I. Agi, P. J. Hurst, and K. W. Current, "An Image Processing IC for Backprojection and Spatial Histogramming in a Pipelined Array," *IEEE Journal of Solid-State Circuits*, Vol. 28(3), March, 1993, pp. 210–221;

14. H. Samet, *The Design and Analysis of Spatial Data Structures*, Addison-Wesley, Reading, Mass., 1990;

15. A. Klinger and C. R. Dyer, "Experiments on Picture Representation Using Regular Decomposition," *Computer Graphics and Image Processing*, Vol. 5, March, 1976, pp. 68–105;

16. M. Ressler et al., "The Army Research Laboratory Ultra-Wideband Testbed Radars," *IEEE 1995 International Radar Conference*, Alexandria, Va., May, 1995; and 17. L. Happ et al., "Low-Frequency Ultra-Wideband Synthetic Aperture Radar 1995 BoomSAR Tests," *IEEE 1996 National Radar Conference*, Ann Arbor, Mich., May, 1996.

SUMMARY OF THE INVENTION

It is an object of the invention to provide a method and system for quickly generating sharp images from projection data obtained from SAR, ISAR, x-ray tomography, MRI, seismic, sonar, acoustic and other sensor systems.

It is a further object of the invention to provide such a method and system which produce sharp images such as those associated with backprojection at a speed on the order of the speed of the ωk method so as to allow a direct trade between processing speed and focused image quality.

It is a further object of the invention to provide such a method and system which combine the advantages of time-domain backprojection in terms of simple motion compensation, acceptance of unevenly spaced apertures, simple and spatially unconstrained propagation velocity compensation, localized processing artifacts and low interprocessor communications (e.g., no 2D FFT corner turn memory operations) with the computational efficiency of the ωk technique.

It is a further object of the invention to produce multi-resolution imagery simultaneously with the image formation operation as intermediate stages thereof in a manner which is computationally costless.

To achieve these and other objects, the present invention is directed to a method and system for forming images by applying a divide-and-conquer strategy to the coherent summation of the time domain backprojector. As a result, the present invention inherits the advantages of the time domain backprojection technique. The computational savings of the present invention are achieved at the expense of processing artifacts. These artifacts, however, are controllable and can be traded against speed. They are also constrained just as they are in the standard backprojector. The computational savings are achieved by exploiting spatial redundancy in the sub-problems of the divide-and-conquer decomposition. This approach leads to a technique that may be viewed as recursively forming antenna-array beam patterns from sub-aperture arrays that get longer and longer with each recursion and that cover smaller and smaller subimages with each recursion. Using the array beam patterns of one stage as element patterns for the next aperture (an aperture of apertures) effectively factors common additions from the coherent summation. This factorization is the source of the computational efficiency of the present invention. Each stage of the recursion produces beams that are narrower in cross-range. Simultaneously, the extent of range coverage is reduced at each stage in the recursion. As such, the focused "beams" at each stage cover progressively smaller subimages in both range and cross-range. When carried to completion, this process reaches a terminal stage where each "beam" contains a single focused pixel. The processing performed according to the present invention has a tree structure that is readily parallelizable and requires only limited interprocessor communication. This feature eliminates the corner-turn interprocessor communication bottleneck associated with Fourier image formation techniques.

The technique according to the preferred embodiment of the present invention can be viewed as a quadtree decomposition of the SAR image formation problem. Quadtrees are a general class of hierarchical data structures that are based on the principle of recursive decomposition of space. Quadtrees have been applied to a wide range of problems in image analysis and coding. Recent applications include lossless image compression, transform coding and vector quantization, and sub-band coding of images, among others. However, quadtrees have not heretofore been applied to SAR image formation.

The quadtree SAR image formation according to the present invention has complexity comparable with that of the ωk algorithm. For a SAR with N aperture points and an image area of $N^2$ pixels, the algorithm achieves $O(N^2 \log N)$ complexity by applying a strategy that multiplies (e.g., doubles) the subaperture length and divides (e.g., halves) the subimage dimensions in both range and cross-range at each stage of the recursion. More or less speedup can be obtained by applying other strategies that ultimately depend on the geometry and acceptable artifact "sidelobe" levels, as those skilled in the art will readily appreciate upon review of this disclosure. This flexibility allows the method and system of the present invention to directly trade processing speed and image quality. In typical SAR systems, N is between 1000 and 40,000, so that the speedup relative to the known backprojection technique is on the order of 100 to 1000.

BRIEF DESCRIPTION OF THE DRAWINGS

The preferred embodiment of the invention will now be set forth in detail with reference to the drawings, in which:

FIGS. 4A–4D show a bitmap image and its quadtree decomposition;

DETAILED DESCRIPTION OF THE PREFERRED EMBODIMENT

Quadtrees refer to a broad class of hierarchical data structures that share the principle of recursive decomposition of space. Specific applications of quadtrees are differentiated by:

1. the type of data they are used to represent,
2. the principle guiding the decomposition process, and
3. the resolution, fixed or variable (adaptive).

Figure 3:
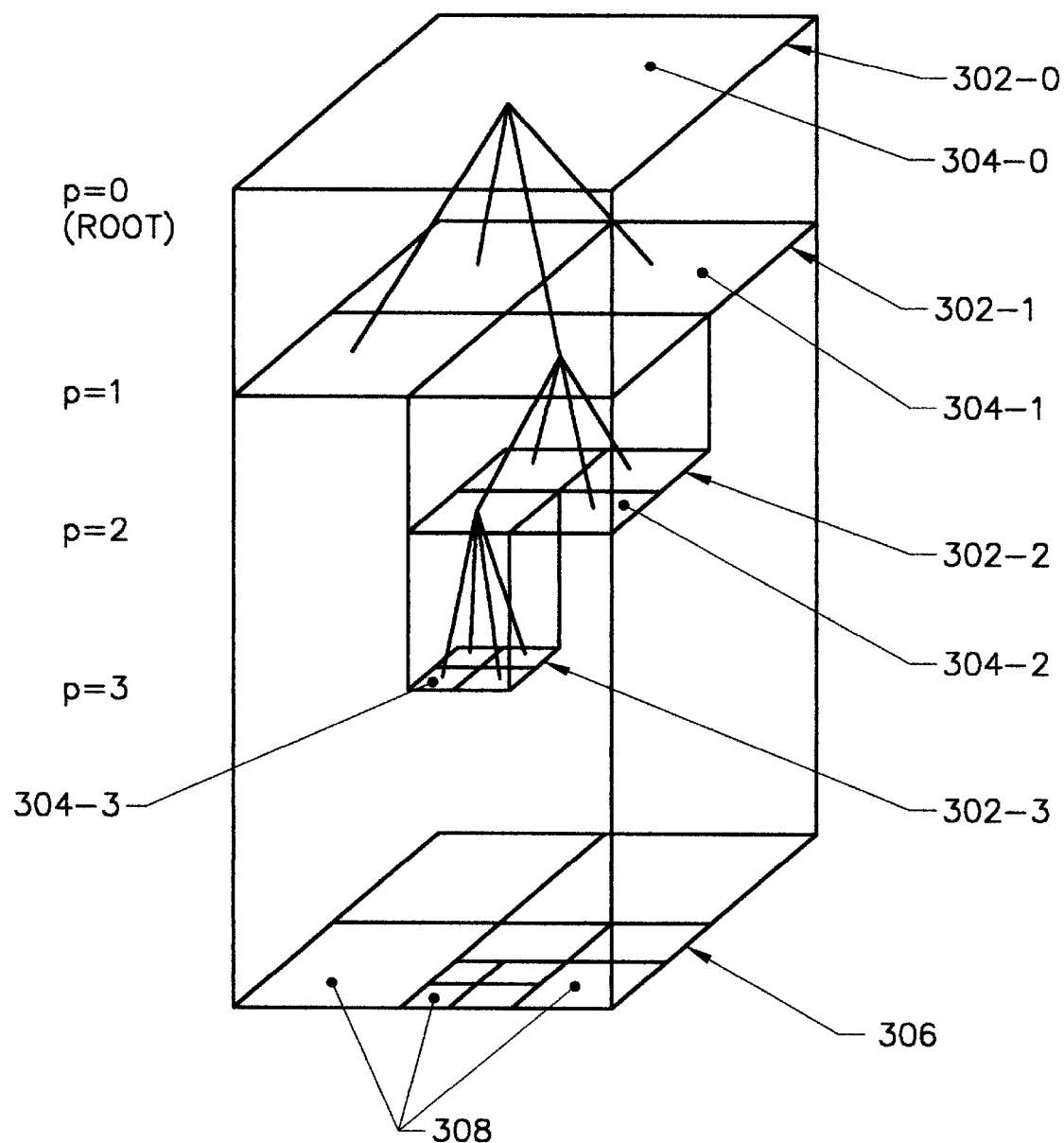
FIG. 3 shows a diagram of quadtree decomposition of an image plane.

Typically, quadtrees are applied to image data. The images are two-dimensional arrays of pixels which may be binary (black/white), gray-scale or color. The principle of the decomposition refers to the manner in which the image is segmented at each stage of the recursion. The most common method, shown in FIG. 3, is to partition image area 302-0, which at root stage p=0 of the decomposition is considered to consist of single portion 304-0, into quadrants 304-1 of equal area to form image area 302-1 in stage p=1 of the decomposition. Each quadrant 304-1 is further partitioned into quadrants 304-2, 304-3, etc. of equal area at each stage p=2, p=3, etc. of the recursion to obtain successively partitioned image areas 302-2, 302-3, etc. until partitioned image space 306 results. In partitioned image space 306, portions 308 are the smallest possible quadrants of a single color, which may be individual pixels.

Variable resolution procedures allow the nodes to be of arbitrary size and allow the decomposition to stop at any stage. Such quadtrees have variable block sizes and are frequently used in image compression. FIGS. 4A–4D show a basic example of variable block size image coding on a black and white image. FIG. 4A shows binary black-and-white image 402 made up of black pixels 404 (pixel value= 1) and white pixels 406 (pixel value=0). In quadtree decomposition, image 402 is decomposed into subimages until all pixels in a subimage have the same color (black or white, namely, 1 or 0). The subimages associated with the decomposition are shown in FIG. 4B, in which each subimage is either all black or all white, as a comparison with FIG. 4A will show. The subimages are numbered according to the quadrant numbering scheme shown in FIG. 4D. It will be readily apparent that this decomposition achieves lossless compression; for example, in subimage 1.1, the color has to be indicated only once, as opposed to sixteen times for original image 402. FIG. 4C shows complete quadtree decomposition tree 408 for image 402. Each stage p=1 or p=2 of the decomposition produces all-white quadrants 410, all-black quadrants 412 (shown as shaded) or nodes 414 of no single color. The all-white and all-black quadrants are accepted as portions of the final decomposition, while the nodes of no single color are further decomposed. At stage p=3, all quadrants are of a single color, and the decomposition is complete.

The complexity of the quadtree data structure can be measured in terms of the number of stages of the decomposition, the dimension of the subimages at each stage, and the number of subimages. Below, these are developed for a halving strategy applied to square (power of two size) images. At each stage of this decomposition the dimensions of each image block are halved, resulting in a partition of the image block into equal area square quadrants.

In equation (2) below, the image area is N×N, where $N=2^M$. If the halving strategy is carried to completion, there will be M+1 stages, m=0, . . . , M. The root is stage m=0. The subimages at stage m are all of size $2^{(M-m)} \times 2^{(M-m)}$. Each stage has $2^{2m}$ subimages. The total number of subimages in the decomposition, for partition by α in each dimension, is $$\sum_{m=1}^{M} \alpha^{2m} = \frac{\alpha^2(\alpha^{2M} - 1)}{a^2 - 1} \bigg|_{\alpha=2} = \frac{2^{2(M+1)} - 4}{3} \quad (2)$$

Figure 5:
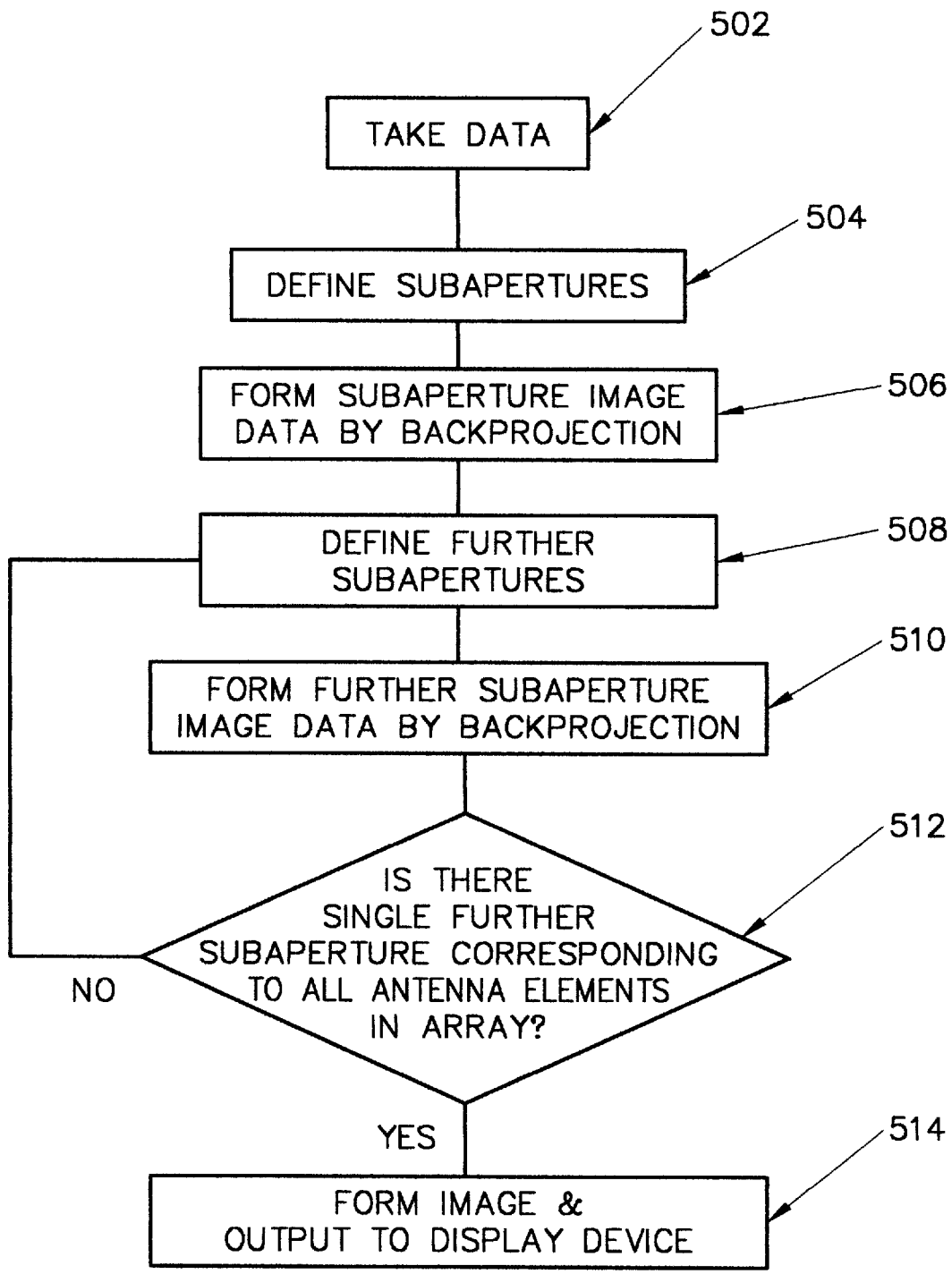
FIGS. 5 and 6 show flow charts of a method according to the present invention.

Quadtree decomposition can be applied to the backprojection technique in the following manner, which will be explained with reference to FIG. 5. Direct application of the focused delay-and-sum image formation of equation (1) takes radar returns collected by antenna elements, sums them, and outputs focused pixels. According to the known backprojection technique, a single long antenna array has been formed from all the available antenna elements, for every pixel. Rather than forming a large single array for each pixel, the present invention utilizes a recursive process where, at each stage, short antenna arrays are formed from the "elements" of the previous stage. At the first stage, once the data are taken in step 502, an "element" is the original data collected at an aperture position. At other stages, an "element" is the result of a summation across a short array of the previous stage. So, the array summation formed in one stage becomes the antenna elements of the next. That is, the antenna elements are grouped into subapertures in step 504, and in each subaperture, an image is formed by backprojection from the antenna data in step 506. The subapertures are grouped into further subapertures in step 508, and an image in each further subaperture is formed by backprojection in step 510. This process is repeated until a single subaperture is defined covering the entire array, as determined in step 512, at which time a completed image is formed and output to a display device in step 514. The elements in each progressive stage are summed to form a narrower beam aimed at, and covering, a subimage of smaller dimension in both range and cross-range. Thus, elements at intermediate stages can be thought of as comprising a spotlight mode SAR. In this process, the length of the subapertures formed will increase from stage to stage. Likewise, the beamwidth decreases from stage to stage, and thus the subimages they cover decrease in cross-range dimension. They also decrease in range dimension to follow the halving strategy in both dimensions. This recursive process, of forming apertures of increasing length that cover subimages of decreasing dimension, is a quadtree decomposition of focused delay-and-sum image formation.

Figure 1:
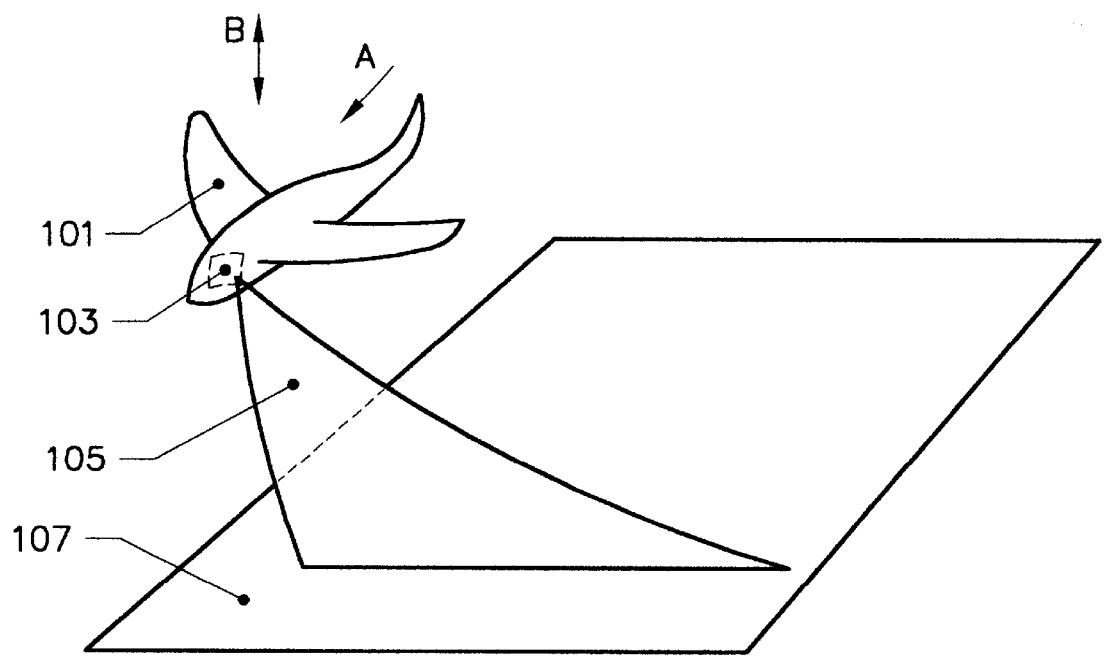
FIG. 1 shows a diagram of the collection of data from a moving airplane as performed in both the prior art and the present invention.
Figure 2:
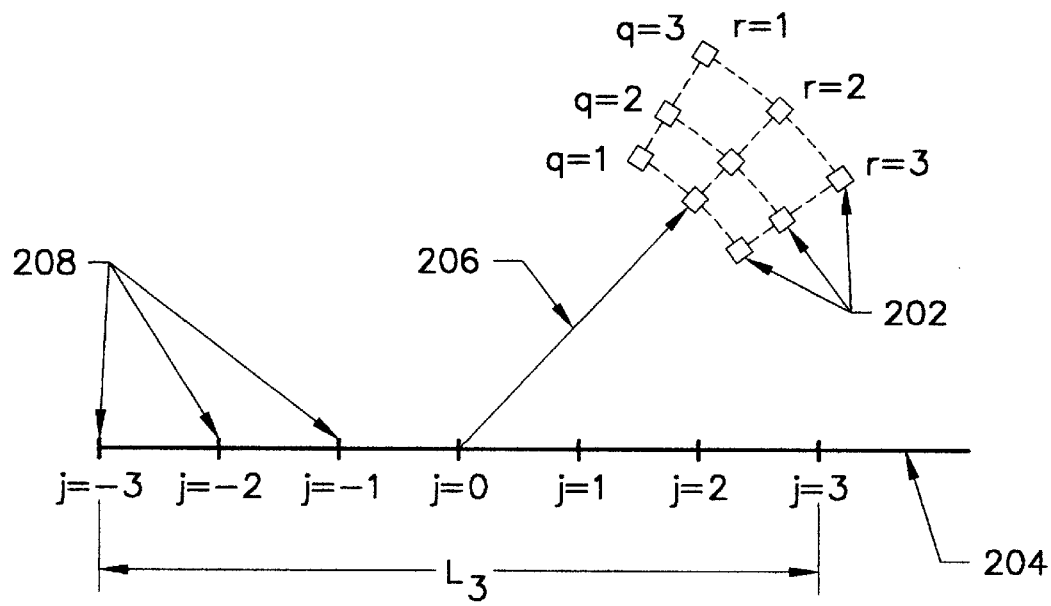
FIG. 2 shows a diagram of pixel positions and aperture locations used in the backprojection technique of the prior art.
Figure 6:
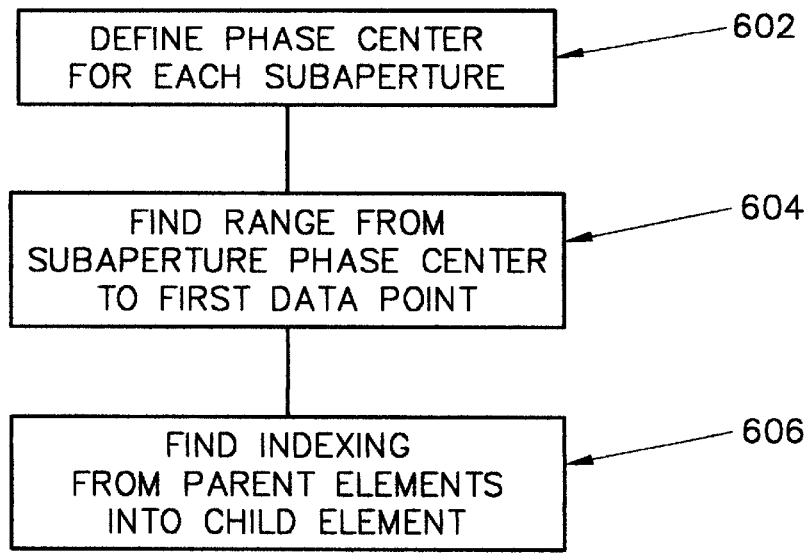

At each stage of the recursion, each subaperture or further subaperture is treated as a single antenna element in the manner shown in FIG. 6. In step 602, a phase center for each subaperture is defined. In step 604, a range from the phase center to the first data point is determined. In step 606, indexing from the parent elements (the subapertures of one step in the recursion) to the child element (the subaperture of a next step in the recursion) is determined, so that each of the parent elements can be treated as a single antenna element of FIG. 2 and its location with respect to the pixels can be determined.

Figure 7:
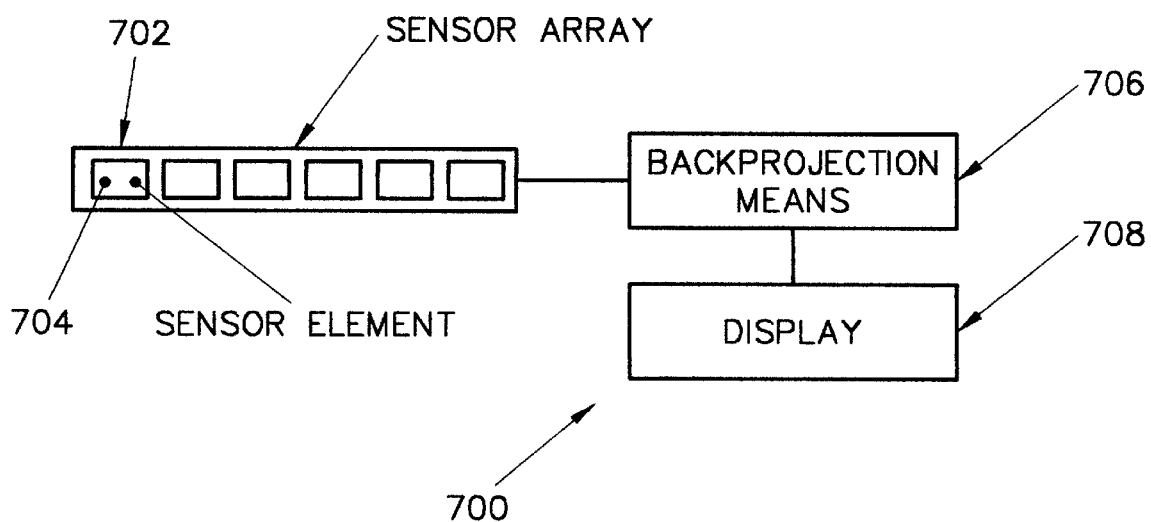
FIG. 7 shows a block diagram of a system according to the present invention.
Figure 8:
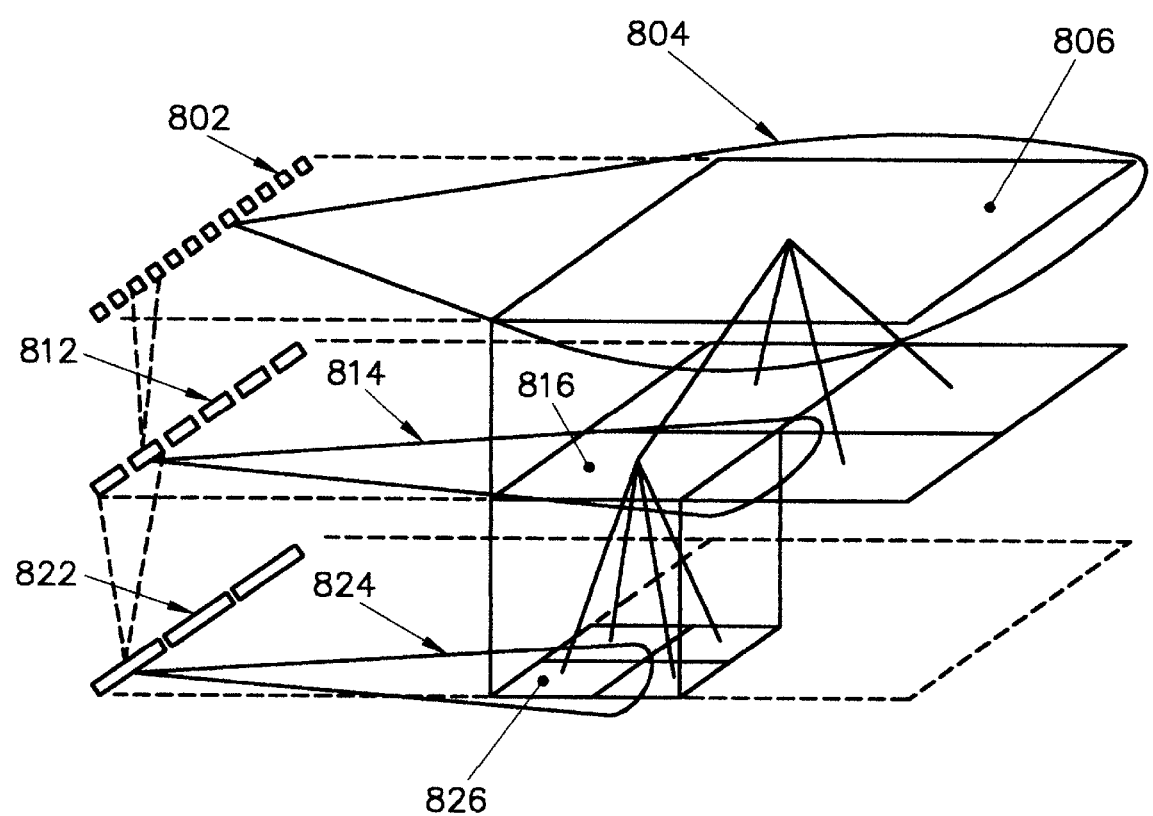
FIG. 8 shows a quadtree decomposition of an SAR image according to the present invention.

The invention can be implemented in a system such as system 700 of FIG. 7. Data are taken with antenna array 702 of antenna elements (or other sensor elements) 704. The process described above is performed in backprojection means 706, which may be a suitably programmed supercomputer, other multi-processor computer, single-processor general-purpose computer, or other computing device. The resulting image is output to display 708.

At each stage of the SAR quadtree, nodes represent the SAR data needed to focus subimages of the image area. The root is the original SAR data formed by antenna elements 802 within beam 804 which covers entire image area 806. At intermediate stages, the data are associated with intermediate antenna arrays 812, 822 formed during the recursion. Thus, each child node will have a different data set, formed within beam 814, 824 to cover subimage 816, 826. As the recursion proceeds, the data is partitioned and summed to cover subimages of decreasing area. If the recursion is stopped before completion, the subimages could be focused by direct delay-and-sum processing of the data in the node associated with the subimage. If the recursion is carried to completion, then each node in the final stage represents a single pixel, and the image formation is complete.

A node of an SAR quadtree contains the SAR data needed to focus its associated subimage. This data is an aperture of antenna beams covering that subimage. At the highest level, the root node is the original SAR data, in which there are many elements in the aperture and the beamwidth of each element covers the entire image area. At the lowest level, a node is a single pixel, or more specifically, a single "beam" one pixel wide and one range bin deep. The data at intermediate nodes contains the intermediate elements with spotlight beams covering intermediate sized subimages. The data making up any particular node can be described by a set of data for each sensor or element in that node. The data set for each element (or sensor) is described by (1) a vector of radar data, (2) the down-range sample spacing of the radar data, (3) the range from the sensor phase-center to the first sample in the radar data vector, and (4) a tuple (e.g., northing, easting, height) for the position of the sensor phase-center. These are summarized in Table 1 and are described below.

1. $S_{p,j}(m)$ is the vector of radar data. p identifies which node in the quadtree the vector belongs to, j indexes the antenna element in the node, and m indexes radar sample (or range bin) in the vector. At the root, $S_{root,j}(m)$ refers to the $m_{th}$ data point collected by the element j of the original sensor array.
2. $X_{p,j}$ is the position used as the phase center of an antenna element. At the root, $S_{root,j}$ is the location of element j in the original array.
3. $r_{p,j}$ is the range from the phase center of the element j to the first data element (i.e., $S_{p,j}(0)$) in meters. At the root, if $T_j$ is the time delay between the pulse leaving the antenna and the start-of-sampling, then $r_{p,j}(m)=u\cdot T_j/2$, where u is propagation velocity in meters/second.
4. $\alpha_c$ is the down-range sample spacing. This is the distance between samples in meters. In this development $\alpha_c$ is fixed for a stage, but may vary from stage to stage. At the root, $\alpha_c=U\cdot T_s/2$, where $T_s$ is the sampling period in seconds.

TABLE 1

Data belonging to a quadtree node.

| | |
|---|---|
| p | identifies the node of the quadtree |
| j | identifies the sensors (or elements) in a node |
| c | identifies the children of a parent |
| $L_c$ | Number of aperture parent elements used in a subaperture to form a child element |
| $N_p$ | Number of aperture elements in the $p^{th}$ node |
| $N_c$ | Number of aperture elements in the child node c |
| $M_{c,k}$ | Number of range bins in $k^{th}$ element of child node c |
| $D_{p,s}$ | Decimation in cross-range from parent p to children subimages (i.e., the count of subimages in cross-range that the parent is divided into) |
| $D_{p,r}$ | Decimation in range going from parent p to children subimages (i.e., the count of subimages in down-range that the parent is divided into) |
| $D_p$ | $= D_{p,r}*D_{p,s}$ is the number of children subimages that node p is divided into |
| $s_{pj}(m)$ | vectors of radar data where m indexes range samples |
| $x_{pj}$ | a tuple representing the position used as the phase center of a subaperture (e.g., northing, easting, and height from a reference position) |
| $r_{pj}$ | range from the phase center to the first sample s |
| $a_c$ | range sample spacing in s (meters) |

A recursion relation is set up wherein p denotes any node in the hierarchy and c is any of its children, $L_c$ is the subaperture length—the number of parent elements summed to form an element for the child, $D_{p,r}$ is the decimation in range, and $D_{p,a}$ is the decimation in cross-range at each stage such that there are $D_p=D_{p,r}\cdot D_{p,a}$ children for each parent. $N_p$ is the number of elements in the parent node and $N_c$ is the number of elements in the child node (so $N_c=N_p/L_c$). At each stage a child data set (i.e., $s_{c,k}$, $s_{c,k}$, $r_{c,k}$ and $\alpha_c$, where k=0, 1, . . . , $N_c$-1) is generated from the parent data set ($s_{p,j}$, $x_{p,j}$, $r_{p,j}$ and $\alpha_p$, where j=0, 1, . . . , Np-1). Four steps are required for this generation: defining the subapertures, defining the phase center for each subaperture, finding the range from the subaperture phase center to the first data point and finding the indexing from the parent elements into the child element.

The subapertures are defined as follows. Element k of the child c is formed from subaperture k of the parent. Subaperture k is defined by the index set $J_{c,k}$ such that element j of the parent is in subaperture k if j ∋$J_{c,k}$. In a simple, non-overlapped, end-to-end breakdown, $J_{c,k}$ is defined as:

$$J_{c,k}=\{kL_c+r:r=0,\ldots,L_c-1\}, k=0,\ldots,N_c-1. \quad (3)$$

Overlapped or other breakdowns are also possible and depend on the data collection geometry.

The phase center of antenna element $s_{c,k}$ is $x_{c,k}$ and is given as a weighted mean position of subaperture $J_{c,k}$.

$$x_{c,k} = \sum_{j \ni J_{p,k}} w_{p,j,k} * x_{p,j} \text{ for } k = 0\ldots N_c - 1 \quad (4)$$

where $w_{p,j,k}=1/L_c$ for a simple mean. Other weighting definitions can be used to affect the artifact positions and levels as well as the losses. For example, equation (5) below is a definition which can be used to shift the phase centers of the subapertures outward toward the ends of the total aperture. η is a parameter to adjust the amount of outward shift. If η=0, the weights approximate the mean position, and if η=1, the phase centers are pushed out such that the subapertures are equally spaced and the synthetic aperture length is the same at all stages.

$$w_{p,j,k} = \begin{cases} \dfrac{k \cdot \eta}{N_c - 1} + \dfrac{1 - \eta}{2} & \text{for } j = \min(J_{p,k}) \\ 0 & \text{otherwise} \\ 1 - \dfrac{k \cdot \eta}{N_c - 1} + \dfrac{1 - \eta}{2} & \text{for } j = \max(J_{p,k}) \end{cases} \quad (5)$$

Figure 9:
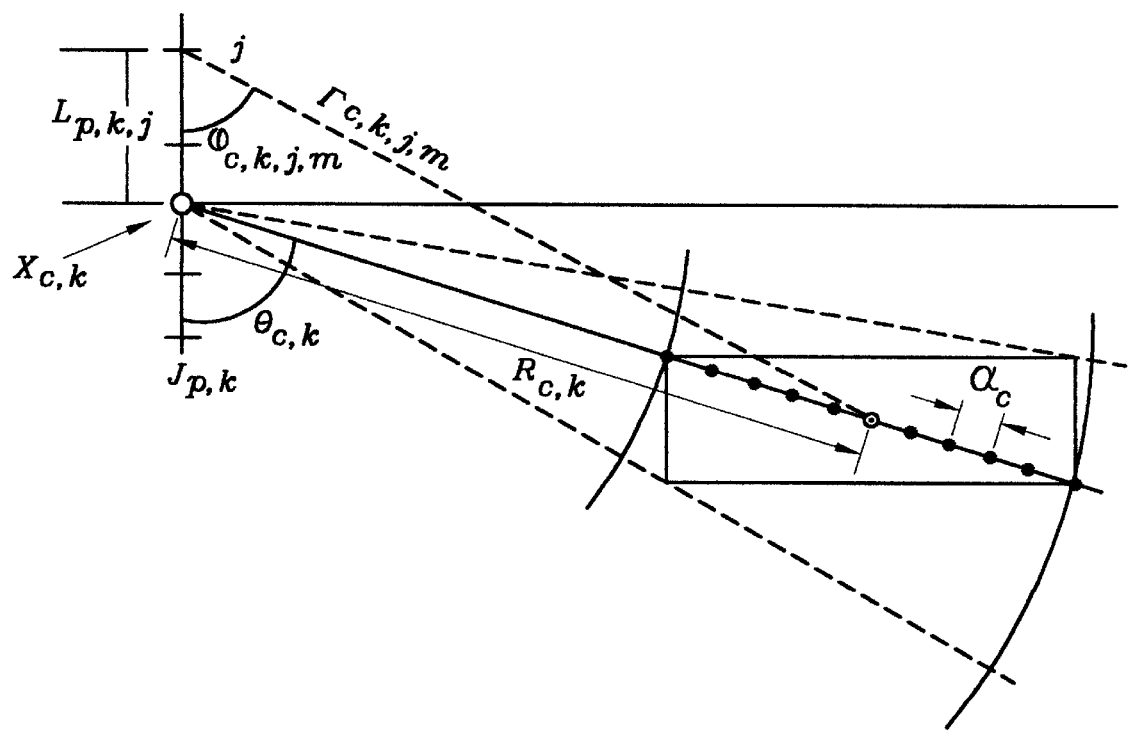
FIG. 9 shows the geometry used in a recursion according to the present invention.

The next step is to find $r_{c,k}$, which is the range from each subaperture phase center ($x_{c,k}$) to the first data point in the child's radar data vectors $s_{c,k}$. Each child refers to a subimage c. With the center of subimage c located at point ($R_{c,k}, \theta_{c,k}$) relative to $x_{c,k}$, vectors $s_{c,k}$ are formed by focusing subaperture $J_{p,k}$ to the line passing through ($R_{c,k}, \theta_{c,k}$) and $x_{c,k}$, with sample spacing, $\alpha_c$, restricted in range to cover only the region of subimage c. This geometry is illustrated in FIG. 9 with a polar coordinate system whose origin is at $x_{c,k}$, the point used as the subaperture's phase center. Where m indexes the position along the line (i.e., the index into $s_{c,k}$) and $H_{c,k}$ is the number of range bins needed before the range-bin at the center of subimage c, to cover subimage c at the $k^{th}$ subaperture, the range to the first sample is given by:

$$r_{c,k} = R_{c,k} - H_{c,k} \alpha_c. \quad (6)$$

FIG. 9 illustrates the geometry to map the parent elements into the child element. Where $M_{c,k}$ is the number of sample points needed to cover subimage c at the $k^{th}$ subaperture and $\Psi_{c,k,m} = r_{c,k} + m\alpha_c$ is the range from the phase center ($x_{c,k}$) to the $m^{th}$ range bin in $s_{c,k}(m)$, the range from the $j^{th}$ element of the parent to the $m^{th}$ data point (or range bin) in $s_{c,k}(m)$ is given by:

$$\Gamma_{c,k,j,m} = \sqrt{\Psi_{c,k,m}^2 + L_{p,k,j}^2 - 2L_{p,k,j}\Psi_{c,k,m}\cos\phi_{c,k,j,m}} \quad (7)$$

where $L_{p,k,j}$ is the distance from element j of the parent to the phase center of the kth subaperture $x_{c,k}$, and $\psi_{c,k,j,m}$ is the angle between (1) the line through the kth phase center $x_{c,k}$ and element j of the parent and (2) the line through element j of the parent and the mth data point in $s_{c,k}(m)$ as shown in FIG. 9. The floating point index into $s_{p,j}$ is then given by $N(c,k,j,m) = (\Gamma_{c,k,j,m} - r_{p,j})/\alpha_c$. This mapping can be approximated with a polynomial and computed recursively for computational efficiency.

The last step is to develop the recursion to generate child radar data from parent radar data, namely, to sum the parent elements to form the child elements:

$$s_{c,k}(m) = \sum_{j \in J_{p,k}} s_{p,j}(N(c,k,j,m)) \quad (8)$$

$$\text{for } m = 0 \ldots M_{c,k} - 1; \; c = 0 \ldots D_p - 1$$

As in the case of the time domain backprojector, obtaining accurate values for $s_{p,j}(N(p,j,m))$ requires an interpolation. Aperture weighting ($z_j$ in equation (1)) can be applied at the root, or it can be made more general and adapted to different children.

The complexity of the quadtree SAR image formation algorithm will now be determined for a halving/doubling strategy, where subimage dimensions are halved (i.e., $D_{p,r} = D_{p,a} = 2$) and subaperture lengths are doubled (i.e., $L_c = 2$) at each stage of the decomposition. The algorithm will be shown to have complexity of $O(N^2 \log N)$, where the aperture length is N, the image size is N×N, and N=2M. Carried to completion, it has M stages indexed as m=1, ..., M. The first stage, m=1, has subimages of size $2^{M-1} \times 2^{M-1}$ pixels, and the last stage, m=M, has subimages of size 1×1 pixel.

One way of deriving the operation count is to total the number of operations required to form the data sets at each stage. The number of operations required by a stage is the product of the number subimages and the operations required for each subimage. Since a halving strategy is applied to the subimage dimensions, the number of subimages in stage m is $2^{2m}$. That is, subimage dimensions are halved at each stage of the decomposition so each parent subimage gives rise to four child subimages, each of half the size in each dimension. At the initial stage, m=0, there is only one subimage, the full image. The total number of operations can be written $$OPS = 0\left( \sum_{m=1}^{M} 2^{2m} \cdot [OPS \text{ per stage } m \text{ subimage}] \right)$$

The number of operations required to form a subimage at stage m is the product of the number of vectors that must be formed at the stage and the number of operations per vector. Since a doubling strategy is applied to aperture length, the number of vectors that must be formed at a child stage is half the number of the parent. The operation count is then $$OPS = 0\left( \sum_{m=1}^{M} 2^{2m} \cdot 2^{M-m}[OPS \text{ per stage } m \text{ vector}] \right)$$

The vectors of a child stage are formed from the parent stage according to equation (8). The summation of (8) runs over the set, $J_{c,k}$ of equation (3). This set gives the number of vectors from the parent stage that are summed to form a single vector of the child stage. For a halving/doubling strategy, this number is 2; thus $$OPS = 0\left( \sum_{m=1}^{M} 2^{2m} \cdot 2^{M-m} \cdot 2 \cdot [\text{Length each stage } m \text{ vector}] \right)$$

The summation of (8) must be performed for each element of the child vector, that is, $M_{c,k}$ times. For the image dimensions in this development, $M_{c,k}$ is proportional to the length of the diagonal of a subimage. Since the subimage dimensions at any stage m are $2^{M-m} \times 2^{M-m}$, the diagonal is proportional to $2^{M-m} \cdot \sqrt{2}$, and the total number of operations is $$OPS = 0\left( \sum_{m=1}^{M} 2^{2m} \cdot 2^{M-m} \cdot 2 \cdot 2^{M-m} \cdot \sqrt{2} \right),$$

$$OPS = 0\left( 2 \cdot \sqrt{2} \cdot 2^{2M} \cdot \sum_{m=1}^{M} 1 \right),$$

$$OPS = 0(N^2 \cdot \log N).$$

The quadtree SAR technique described above has been applied to simulated data. While the technique allows a direct tradeoff between (1) speed and (2) artifacts and losses, the results shown here are for the simple two-element subapertures ($L_c = 2$), recursively halving case ($D_{p,a} = 2$ and $D_{p,r} = 2$) in both dimensions, and geometric mean phase centers ($w_{p,k,j} = 1/L_c$ in equation (4)). The geometry used to generate the simulated data was selected to be consistent with the Army Research Laboratory Ultra-Wideband Boom-SAR. In this case, the aperture spacing was 0.1 meters, the aperture length 100 meters (1000 aperture positions), and the time sampling was 8 GHz. The data was generated for a target situated at a point 208 meters downrange from aperture center and 16 meters off of the aperture center in the cross range dimension.

The target response function used was the fourth derivative of a Gaussian, given by:

$$s(t) = \left( \frac{4}{3} (Kt)^4 - 4 (Kt)^2 + 1 \right) \cdot \exp^{-(Kt)^2}, \quad (9)$$

where $K = 1.08 \times 10^9$.

Figure 10:
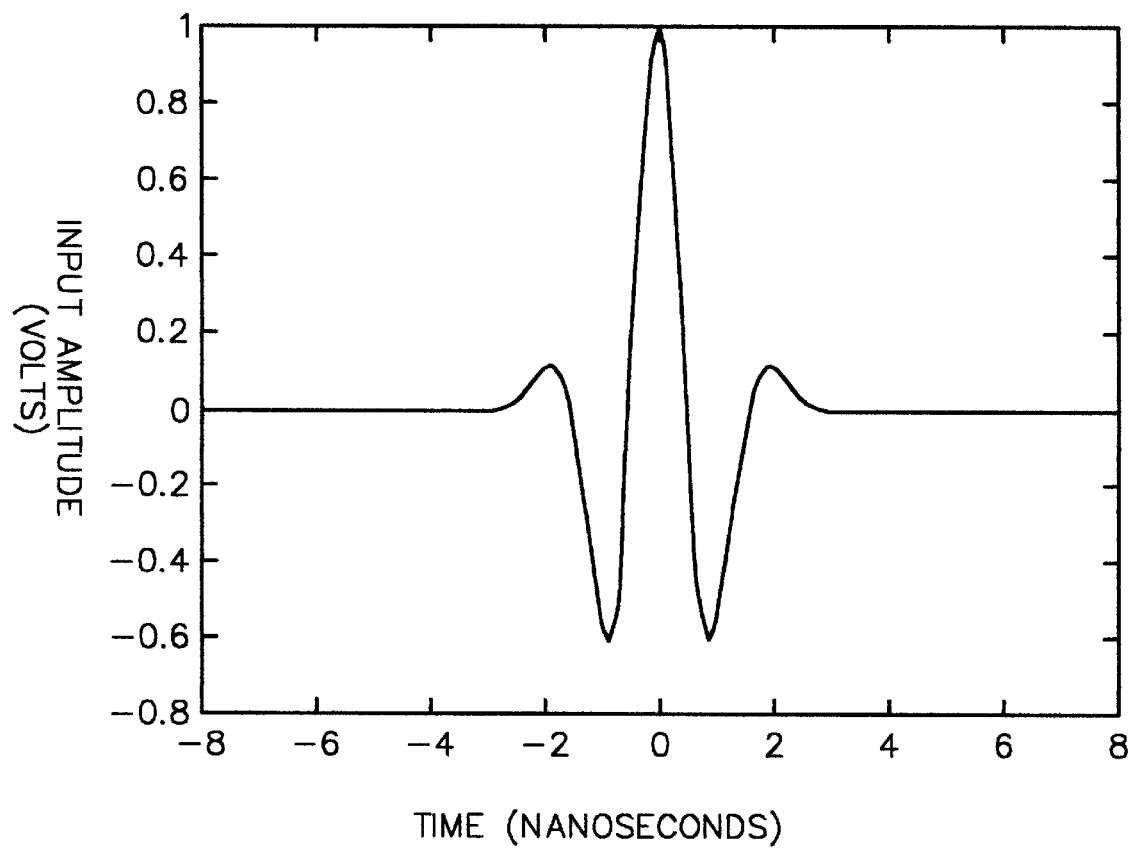
FIGS. 10 and 11 show a target response function formed from simulated data used to test a method according to the present invention.
Figure 11:
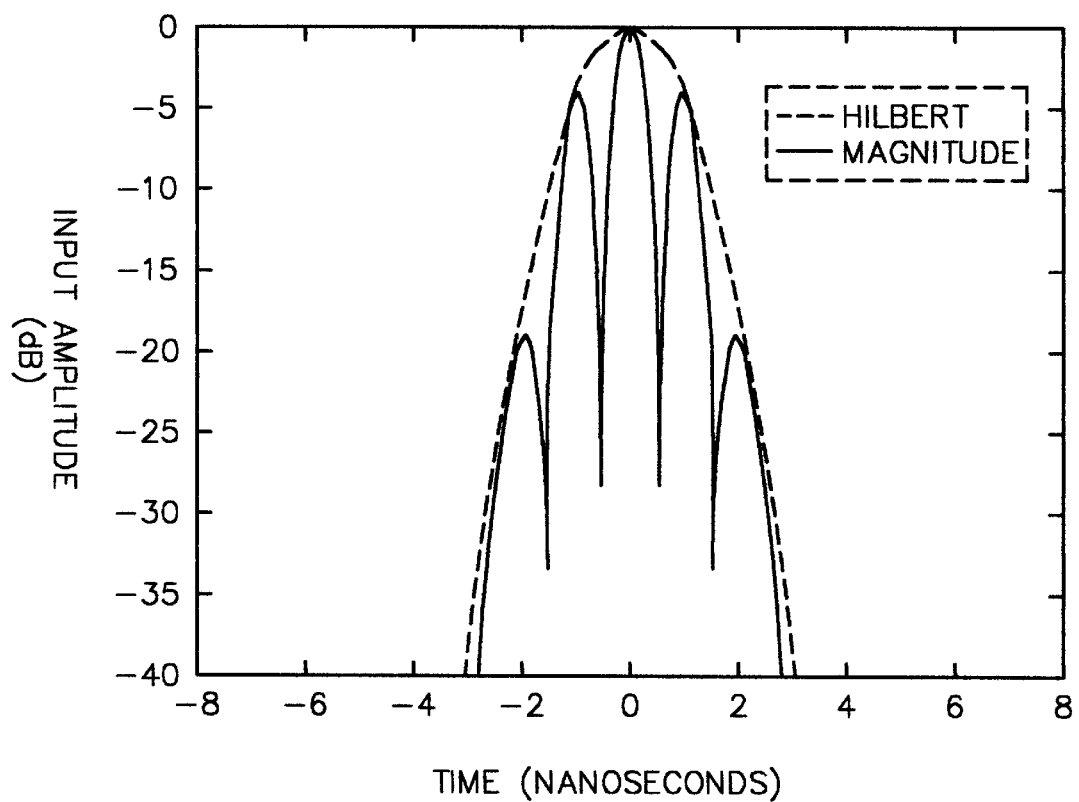

This target response is shown in volts in FIG. 10. It is shown in FIG. 11 on a decibel scale using log magnitude and using a Hilbert transform to compute a magnitude. The simulation generated a downrange record for each aperture point in the array at the proper delay for the geometry.

Focused images were generated from this data set by the quadtree algorithm and by a focused delay-and-sum algorithm as a benchmark. The area imaged was centered at the target position, and both algorithms used a square pixel of 0.0625×–0.0625 meters. The generated images were 1024× 1024 pixels.

Figure 12:
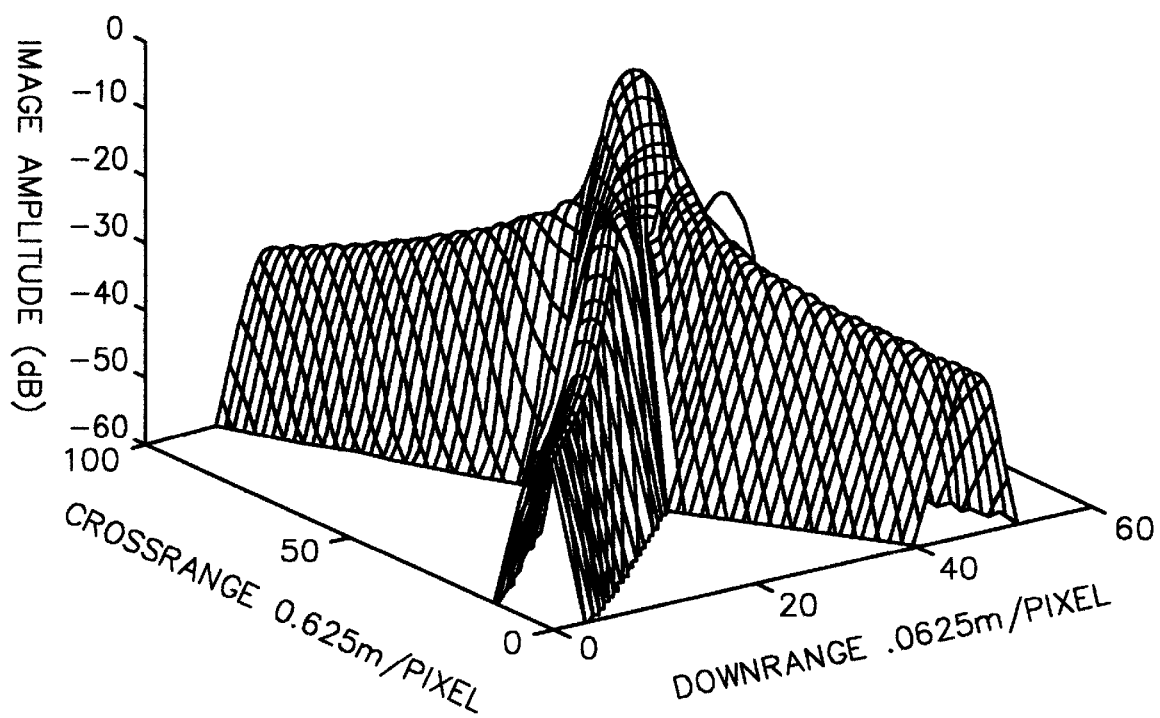
FIG. 12 shows a mesh plot formed from the simulated test data of FIGS. 10 and 11 according to a delay-and-sum technique.
Figure 13:
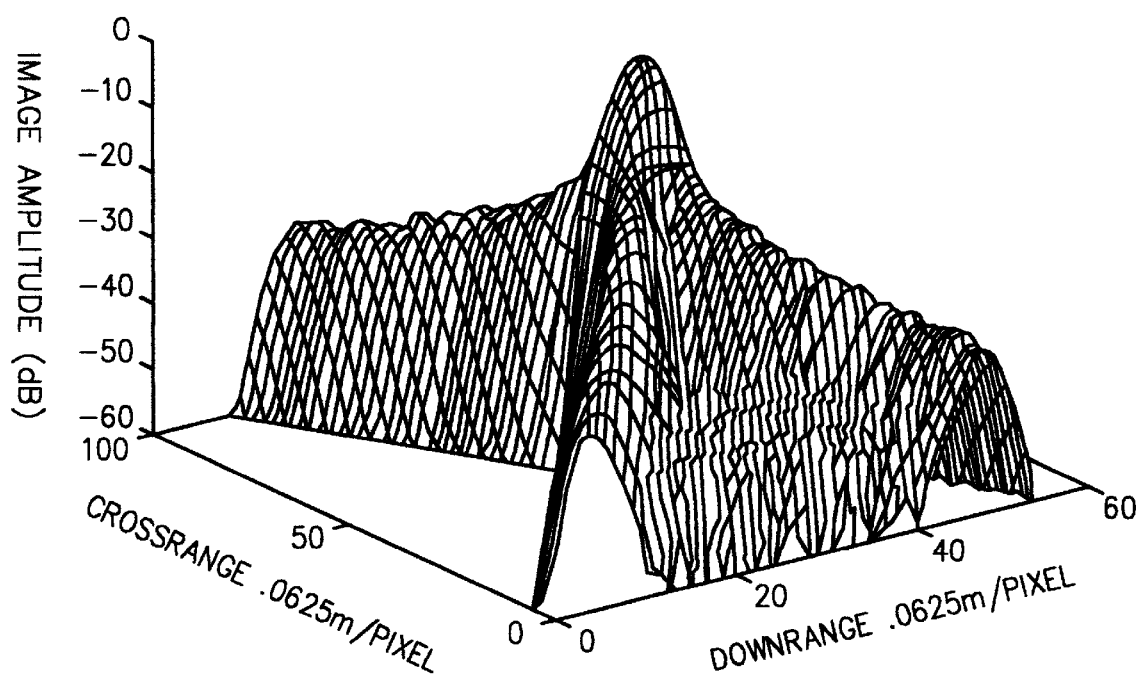
FIG. 13 shows a mesh plot formed from the simulated test data of FIGS. 10 and 11 according to the present invention.
Figure 14A:
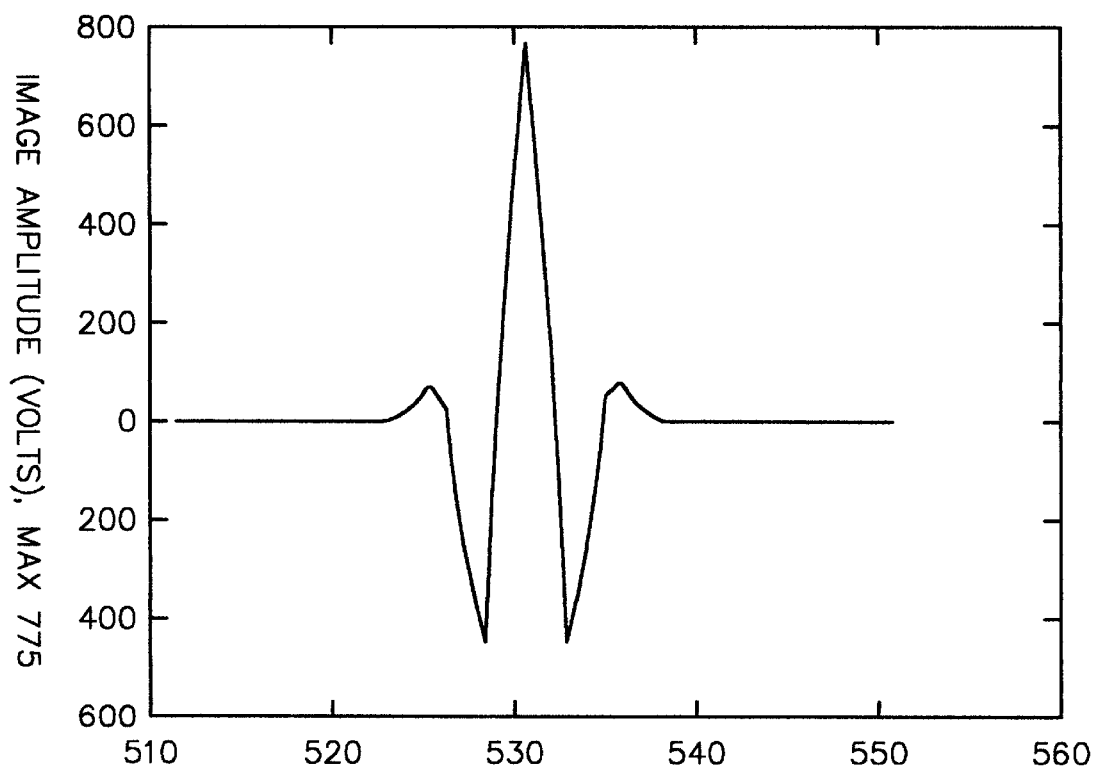
FIGS. 14A and 14B show a downrange profile through a target center formed from the simulated test data of FIGS. 10 and 11 according to the present invention.
Figure 14B:
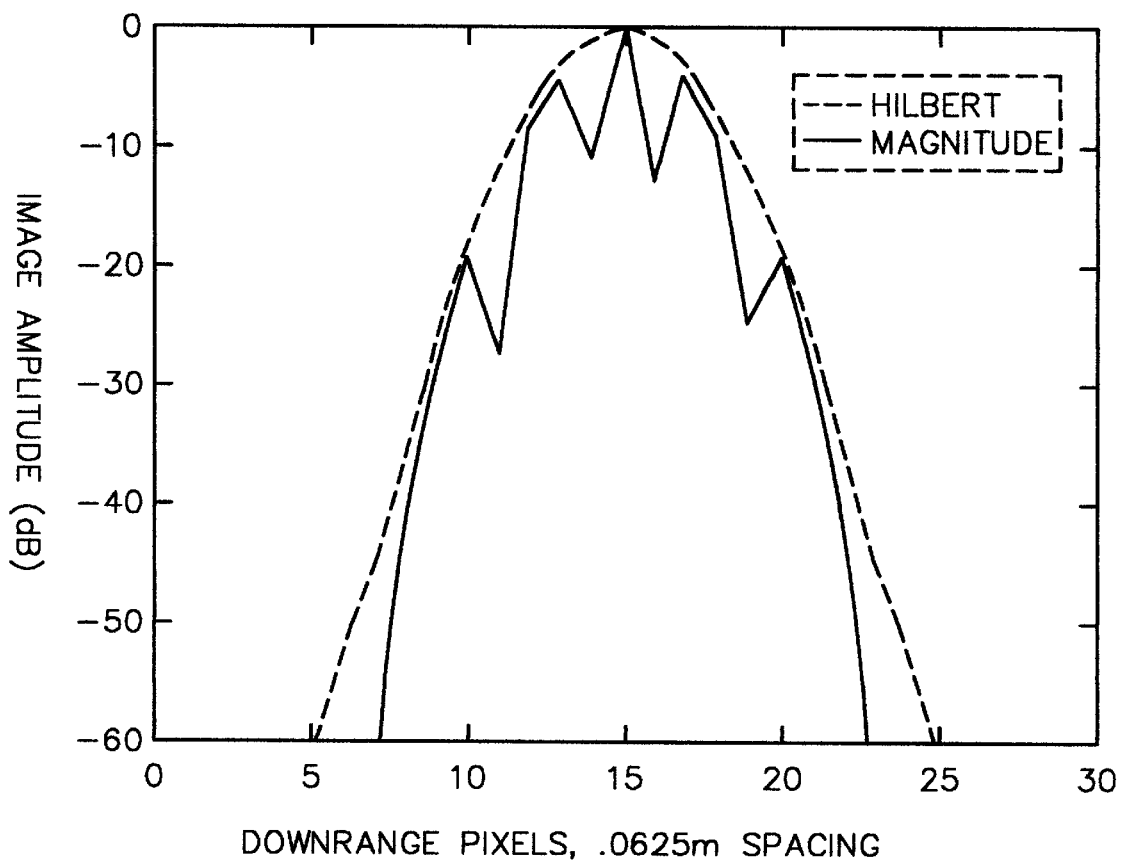
Figure 15:
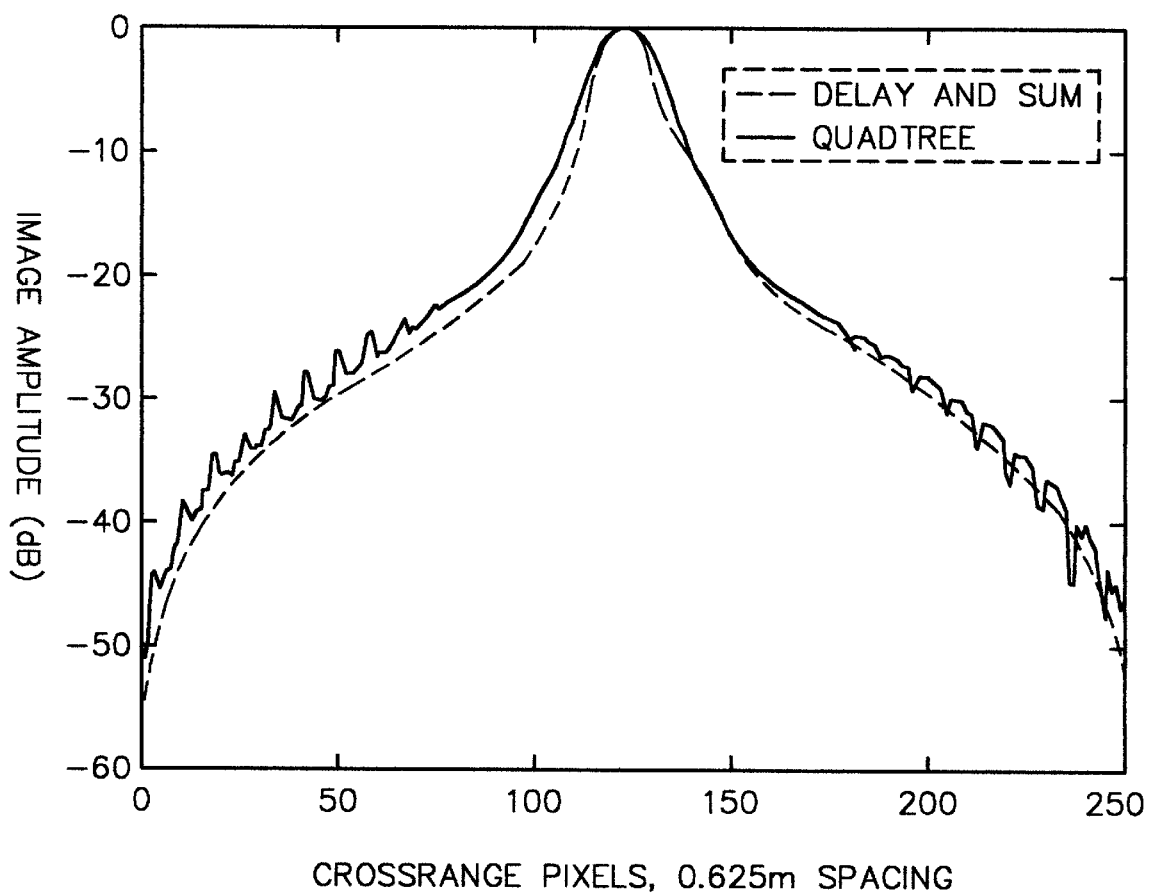
FIG. 15 shows cross-range cuts through the target centers formed from the simulated test data of FIGS. 10 and 11 according to both the delay-and-sum algorithm and the present invention.

FIGS. 12 and 13 are 3D mesh plots showing the results. They clearly show that there are no artifacts in front of the target nor its leading sidelobes from either focuser. They also show that the quadtree implementation tested generates artifacts between the sidelobes.

A downrange profile through the target center is shown in FIG. 9 for the quadtree algorithm. At the pixel spacing of 0.0625 meters, this corresponds to ten input samples to three output samples. While both the quadtree and delay-and-sum algorithms preserved the shape and spectrum of the target impulse response, they achieved different gain. The delay-and-sum (not shown) achieved 811 of a possible 1000, a loss of 1.8 dB. This loss is due to the input sample spacing and linear interpolation used to implement the delay-and-sum. The quadtree algorithm achieved 775 out of a possible 1000, a loss of 2.2 dB with respect to the ideal, and 0.4 dB loss with respect to the delay-and-sum.

Cross-range cuts through the target centers are shown in FIG. 10. Resolution in cross-range, measured as the width of the mainlobe between 3 dB points, is 1.0 meter for the quadtree and 0.8125 meters for the focused delay-and-sum. This degradation can be traded by adjusting $D_{p,a}$, $D_{p,r}$, $L_c$, $\alpha_c$ and $w_{p,k,j}$ to control the errors.

As explained above, the system and method according to the present invention achieve an $O(N^2 \log N)$ time domain focusing technique. The technique inherits the advantages of backprojection, such as accepting arbitrary flight paths and constraining artifacts to be local to the target generating them. Other modifications within the scope of the invention are possible and will suggest themselves to those skilled in the art who have reviewed this disclosure. Such other modifications include (1) parallelizing the tree structure, (2) developing strategies for pruning the tree, and (3) developing strategies for integrating it with the $\omega k$ algorithm. Pruning would be useful in automatic target recognition applications, for example, to allow a pre-screening detector to be applied at an intermediate (lower resolution) stage and the image formation proceed to high resolution only in areas likely to contain targets. Therefore, the scope of the present invention is to be construed only by the appended claims.

I claim:

1. A method of forming an image within a region, the method comprising:

(a) providing an array of sensor elements;

(b) taking data within the region over a time interval with the array of sensor elements;

(c) defining a plurality of subapertures, each of which corresponds to one of the sensor elements in the array;

(d) for each of the subapertures, forming subaperture image data by performing backprojection on the data taken with the sensor elements corresponding to said each of the plurality of subapertures;

(e) defining a plurality of further subapertures, each of which corresponds to a subplurality of the plurality of subapertures;

(f) for each of the plurality of further subapertures, forming further subaperture image data by performing backprojection on the subaperture image data formed for the subapertures corresponding to said each of the plurality of further subapertures as though each of the subapertures were a single sensor element;

(g) defining successively larger further subapertures and forming further subaperture image data for the successively larger further subapertures by repeating steps (e) and (f) until a single further subaperture corresponding to all of the sensor elements in the array is formed;

(h) forming the image in accordance with the subaperture image data for the single further subaperture; and (i) outputting the image to a display device.

2. A method as in claim 1, wherein step (c) comprises defining the plurality of subapertures so that they do not overlap.

3. A method as in claim 2, wherein the subapertures and further subapertures are defined in accordance with a quadtree decomposition of the region, the quadtree decomposition comprising a plurality of nodes including a root node.

4. A method as in claim 3, wherein:

each node of the quadtree decomposition except the root node has a parent node of which said each node is a child node; and at said each node except the root node, each of the subapertures or further subapertures has a phase center which is calculated as a weighted mean of phase centers of sensor elements, subapertures or further subapertures in the parent node of said each node except the root node.

5. A method as in claim 4, wherein, in step (f), the backprojection is performed taking the phase centers of the subapertures or further subapertures of the parent node as locations of sensor elements in the parent node.

6. A method as in claim 4, wherein the phase center of said each of the subapertures or further subapertures is calculated using a weighting coefficient which is equal for all of the phase centers in the parent node.

7. A method as in claim 4, wherein the phase center of said each of the subapertures or further subapertures is calculated such that at each node, a total aperture length remains constant and the further subapertures are evenly spaced.

8. A method as in claim 1, wherein, during step (b), the array is in motion.

9. A method as in claim 1, wherein the subapertures and further subapertures are defined in accordance with a quadtree decomposition of the region, the quadtree decomposition comprising a plurality of nodes including a root node.

10. A method as in claim 9, wherein:

each node of the quadtree decomposition except the root node has a parent node of which said each node is a child node; and at said each node except the root node, each of the subapertures or further subapertures has a phase center which is calculated as a weighted mean of phase centers of sensor elements, subapertures or further subapertures in the parent node of said each node except the root node.

11. A method as in claim 10, wherein, in step (f), the backprojection is performed taking the phase centers of the subapertures or further subapertures of the parent node as locations of sensor elements in the parent node.

12. A method as in claim 10, wherein the phase center of said each of the subapertures or further subapertures is calculated using a weighting coefficient which is equal for all of the phase centers in the parent node.

13. A method as in claim 10, wherein the phase center of said each of the subapertures or further subapertures is calculated such that at each node, a total aperture length remains constant and the further subapertures are evenly spaced.

14. A method as in claim 1, wherein, during step (b), the array is in motion.

15. A system for of forming an image within a region, the system comprising:
 (a) an array of sensor elements for taking data within the region over a time interval;
 (b) backpropagation means, receiving the data, for:
  (i) defining a plurality of subapertures, each of which corresponds to a plurality of the sensor elements in the array;
  (ii) for each of the subapertures, forming subaperture image data by performing backprojection on the data taken with the sensor elements corresponding to said each of the plurality of subapertures;
  (iii) defining a plurality of further subapertures, each of which corresponds to a subplurality of the plurality of subapertures;
  (iv) for each of the plurality of further subapertures, forming further subaperture image data by performing backprojection on the subaperture image data formed for the subapertures corresponding to said each of the plurality of further subapertures as though each of the subapertures were a single sensor element;
  (v) forming successively larger further subapertures and forming further subaperture image data for the successively larger further subapertures by repeating operations (iii) and (iv) until a single further subaperture corresponding to all of the sensor elements in the array is formed;
  (vi) forming the image in accordance with the subaperture image data for the single further subaperture; and
 (c) a display device for displaying the image.

16. A system as in claim 15, wherein the plurality of subapertures defined by the backpropagation means do not overlap.

17. A system as in claim 16, wherein the subapertures and further subapertures are defined in accordance with a quadtree decomposition of the region, the quadtree decomposition comprising a plurality of nodes including a root node.

18. A system as in claim 17, wherein:
 each node of the quadtree decomposition except the root node has a parent node of which said each node is a child node; and
 at said each node except the root node, each of the subapertures or further subapertures has a phase center which is calculated as a weighted mean of phase centers of sensor elements, subapertures or further subapertures in the parent node of said each node except the root node.

19. A system as in claim 1 wherein, in operation (iv) of the backpropagation means, the backprojection is performed taking the phase centers of the subapertures or further subapertures of the parent node as locations of sensor elements in the parent node.

20. A system as in claim 18, wherein the phase center of said each of the subapertures or further subapertures is calculated using a weighting coefficient which is equal for all of the phase centers in the parent node.

21. A system as in claim 18, wherein the phase center of said each of the subapertures or further subapertures is calculated such that at each node, a total aperture length remains constant and the further subapertures are evenly spaced.

22. A system as in claim 15, further comprising means for moving the array while the array takes the data.

23. A system as in claim 15, wherein the backprojection means comprises a single-processor computer.

24. A system as in claim 15, wherein the backprojection means comprises a multiple-processor computer.

25. A system as in claim 15, wherein the subapertures and further subapertures are defined in accordance with a quadtree decomposition of the region, the quadtree decomposition comprising a plurality of nodes including a root node.

26. A system as in claim 25, wherein:
 each node of the quadtree decomposition except the root node has a parent node of which said each node is a child node; and
 at said each node except the root node, each of the subapertures or further subapertures has a phase center which is calculated as a weighted mean of phase centers of sensor elements, subapertures or further subapertures in the parent node of said each node except the root node.

27. A system as in claim 26 wherein, in operation (iv) of the backpropagation means, the backprojection is performed taking the phase centers of the subapertures or further subapertures of the parent node as locations of sensor elements in the parent node.

28. A system as in claim 26, wherein the phase center of said each of the subapertures or further subapertures is calculated using a weighting coefficient which is equal for all of the phase centers in the parent node.

29. A system as in claim 26, wherein the phase center of said each of the subapertures or further subapertures is calculated such that at each node, a total aperture length remains constant and the further subapertures are evenly spaced.

* * * * *